US007191203B2

(12) United States Patent
Wang (10) Patent No.: US 7,191,203 B2
(45) Date of Patent: Mar. 13, 2007

(54) METHOD AND SYSTEM FOR HIGH-SPEED MULTIPLICATION

(75) Inventor: Minsheng Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 650 days.

(21) Appl. No.: 10/253,640

(22) Filed: Sep. 25, 2002

(65) Prior Publication Data
US 2004/0059771 A1 Mar. 25, 2004

(51) Int. Cl.
G06F 7/52 (2006.01)
(52) U.S. Cl. .................................... 708/625
(58) Field of Classification Search ......... 708/625–632
See application file for complete search history.

(56) References Cited

U.S. PATENT DOCUMENTS

| 5,528,529 A | * | 6/1996 | Seal ........................ 708/628 |
| 5,751,619 A | * | 5/1998 | Agarwal et al. ............ 708/523 |
| 6,085,214 A | * | 7/2000 | De Angel ................... 708/628 |
| 6,183,122 B1 | * | 2/2001 | De Angel ................... 708/631 |

FOREIGN PATENT DOCUMENTS

EP 0 813 143 A2 12/1997

OTHER PUBLICATIONS

Hennessy, J. and Patterson, D., *Computer Organization and Design: The Hardware/Software Interface*, Morgan Kaufmann Publishers, Inc., 1994, pp. 198-212.

Madrid, P. et al., "Modified Booth Algorithm for High Radix Fixed-Point Multiplication," *IEEE Transactions on Very Large Integration (VLSI) Systems*, IEEE, vol. 1, No. 2, Jun. 1993, pp. 164-167.

Mori, J. et al., "A 10-ns 54×54-b Parallel Structured Full Array Multiplier with 0.5-μm CMOS Technology," *IEEE Journal of Solid-State Circuits*, IEEE, vol. 26, No. 4, Apr. 1991, pp. 600-606.

Sam, H. and Gupta, A., "A Generalized Multibit Recoding of Two's Complement Binary Numbers and Its Proof with Application in Multiplier Implementations," *IEEE Transactions on Computers*, IEEE, vol. 39, No. 8, Aug. 1990, pp. 1006-1015.

Weste, N. and Eshraghian, K., *Principles of CMOS VLSI Design: A Systems Perspective*, Second Edition, Addison-Wesley Publishing Company, 1993, pp. 542-560.

Villeger, D. and Oklobdzija, V., "Evaluation of Booth encoding techniques for parallel multiplier implementation," *Electronic Letters*, IEEE, vol. 29, No. 23, Nov. 11, 1993, pp. 2016-2017.

European Search Report for European Appln. 03 02 1760.8 mailed Jul. 5, 2006, 3 pages.

* cited by examiner

*Primary Examiner*—Kakali Chaki
*Assistant Examiner*—Chat C. Do
(74) *Attorney, Agent, or Firm*—Sterne, Kessler, Goldstein & Fox P.L.L.C.

(57) ABSTRACT

A system, method, and computer product for high-speed multiplication of binary numbers. A multiplier X is first encoded, and the encoded multiplier is then used in a multiplication process that yields the product. The encoding is performed in a manner that allows the actual multiplication process to proceed quickly. X is copied into a variable Z. Z is then manipulated to form the coded version of the multiplier. The bits of the multiplier X are read two at a time, starting with the least significant two bits. If the bit pair $X_{i+1}X_i$ is equal to 11, then 1 is added to $Z_{i+2}$. The process continues for successive non-overlapping pairs of bits, until the most significant three bits of X are reached. These last three bits are encoded using a table look-up process.

6 Claims, 7 Drawing Sheets

METHOD AND SYSTEM FOR HIGH-SPEED MULTIPLICATION

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (submitted on a compact disc and an incorporation-by-reference of the material on the compact disc)

Not applicable.

BACKGROUND OF THE INVENTION

1. Field of the Invention

The invention described herein relates to arithmetic processing.

2. Background Art

Booth encoding is widely used in the implementation of hardware multipliers because it reduces the number of partial products in multiplication. In essence, the Booth's encoding looks at a multiplier X two bits at a time, starting with the least significant bits (LSB), and depending on the particular combination at hand, it does one of the three operations:

a) If $X_i X_{i-1} = 00$ or $11$, then shift the existing sum of partial products one bit to the right, where $X_i$ represents the $i^{th}$ bit of X.

b) If $X_i X_{i-1} = 01$ then add the multiplicand Y to the existing sum of partial products and then shift the result one bit to the right.

c) If $X_i X_{i-1} = 10$ then subtract the multiplicand Y from the existing sum of partial products and then shift the result one bit to the right.

The process starts by appending a 0 to the right of the LSB of the multiplier X, and then looking at binary pairs. The successively considered pairs share one bit, so that in every iteration only one bit of the multiplier is processed and eliminated.

EXAMPLE 1

To illustrate Booth encoding, multiply the multiplicand 9 (1001 in 2's complement) by the multiplier 5 (0101 in 2's complement). The partial product sum is initialized to 0. The Booth multiplication is as follows:

Step 1). Append 0 to the multiplier 0101, and get 01010.

Step 2). Since the LSB pair $X_0 X_{-1} = 10$, we subtract the multiplicand 1001 from the partial product sum 0, and then shift the result one bit to the right.

Step 3). Since $X_1 X_0 = 01$, we add the multiplicand 1001 to the existing sum of partial products and then shift the result one bit to the right.

Step 4). Since $X_2 X_1 = 10$, we subtract the multiplicand 1001 from the existing sum of partial products, and then shift the result one bit to the right.

Step 5). Since $X_3 X_2 = 01$, we add the multiplicand 1001 to the existing sum of partial products and get the final product, which is 45 in decimal.

|   |   |   |   | 0 | 0 | 0 | 0 | (initial partial product) |
|---|---|---|---|---|---|---|---|---|
|   |   |   | -1 | 0 | 0 | 1 |   | (step 2) |
|   |   | 1 | 0 | 0 | 1 |   |   | (step 3) |
|   | -1 | 0 | 0 | 1 |   |   |   | (step 4) |
| 1 | 0 | 0 | 1 |   |   |   |   | (step 5) |
| 0 | 1 | 0 | 1 | 1 | 0 | 1 |   | (final product, decimal 45) |

Booth encoding was invented in 1951. A decade later MacSorley proposed the modified Booth encoding, in which a triplet of bits instead of a pair was looked at in each iteration. The modified Booth encoding is summarized in Table 1.

TABLE 1

| Modified Booth encoding | |
|---|---|
| $X_{i+2} X_{i+1} X_i$ | Add to partial product sum |
| 000 | 0 |
| 001 | Y |
| 010 | Y |
| 011 | 2Y |
| 100 | -2Y |
| 101 | -Y |
| 110 | -Y |
| 111 | 0 |

EXAMPLE 2

For the same multiplier and multiplicand in Example 1, the modified Booth encoding comprises of the following steps:

Step 1). Appending 0 to the multiplier 0101, we get 01010.

Step 2). Since the LSB triplet $X_1 X_0 X_{-1} = 010$, we add the multiplicand 1001 to the partial product sum (initially 0000), and then shift the result two bits to the right. The bit $X_0$ in the multiplier has been processed.

Step 3). Since the next triplet $X_3 X_2 X_1 = 010$, we add the multiplicand 1001 to the existing partial product sum, and then shift the result two bits to the right.

Step 4). Since the next triplet $X_5 X_4 X_3 = 000$, we keep the existing partial product sum. Now the final product 45 is obtained.

|   |   |   |   | 0 | 0 | 0 | 0 | (initial) |
|---|---|---|---|---|---|---|---|---|
|   |   |   |   | 1 | 0 | 0 | 1 | (step. 2) |
|   |   | 1 | 0 | 0 | 1 |   |   | (step. 3) |
| 0 | 0 | 0 | 0 |   |   |   |   | (step. 4) |
| 0 | 1 | 0 | 1 | 1 | 0 | 1 |   | (decimal 45) |

The advantage of the Modified Booth encoding over Booth's original encoding lies in the reduced number of iterations required. The iteration is reduced from n steps in Booth encoding to the n/2 steps in the modified Booth encoding, where n is the bit-width of the multiplier.

It is worthwhile noting that during the iterations of both Booth and modified Booth encoding, the number of bits scanned is one bit more than the actual bits processed and eliminated. In another words, there is always one overlapping bit between the current iteration and the next iteration.

This is because both encoding processes need to know the previous bit as well as the present bits to define the operation to be performed on the multiplicand. Therefore, most bits of the multiplier are scanned twice. This creates an inherent inefficiency in processing the multiplier.

Hence there is a need for an improved system and method for multiplying binary numbers, such that the combination of an encoding process and the multiplication process itself is relatively fast and efficient.

BRIEF SUMMARY OF THE INVENTION

The invention described herein is a system, method, and computer product for high-speed multiplication of binary numbers. A multiplier X is first encoded, and the encoded multiplier is then used in a multiplication process that yields the product. The encoding is performed in a manner that allows the actual multiplication process to proceed quickly. X is copied into a variable Z. Z is then manipulated to form the coded version of the multiplier. The bits of the multiplier X are read two at a time, starting with the least significant two bits. If the bit pair $X_{i+1}X_i$ is equal to 11, then 1 is added to $Z_{i+2}$. The process continues for successive non-overlapping pairs of bits, until the most significant three bits of X are reached. These last three bits are encoded using a table look-up process.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Method

Figure 1:
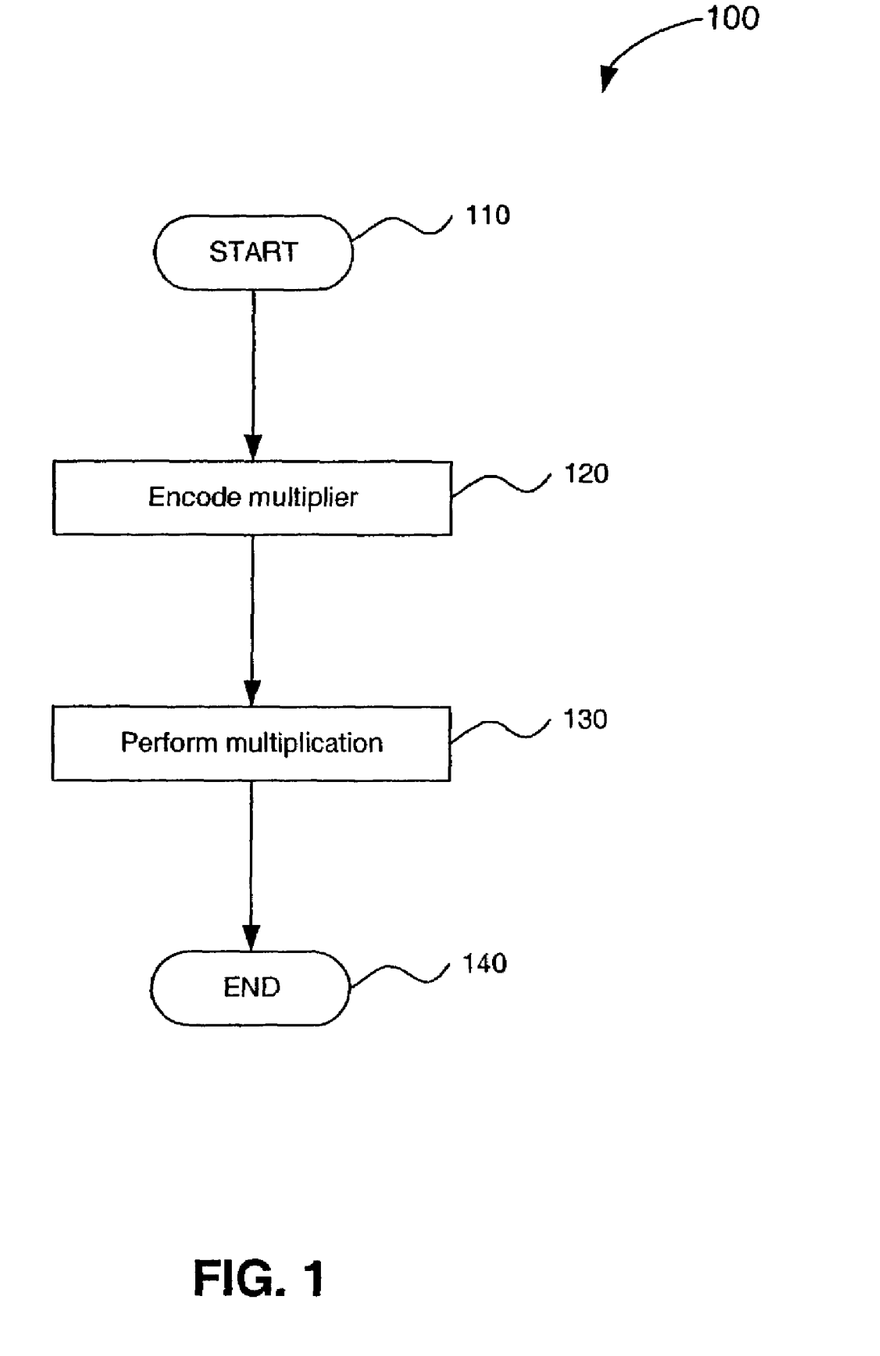
FIG. 1 is a flow chart illustrating the overall processing of the invention.

FIG. 1 illustrates the general process of the invention. The process begins with step 110. In step 120, the multiplier is encoded. As will be described below, the encoding is based on scans of successive, non-overlapping pairs of bits in the multiplier. The encoding permits fast, efficient multiplication in step 130. The process concludes at step 140.

Recall that in the conventional multiplication, the partial product sum is added to, or just shifted, based on the scanning of each bit in the multiplier. In fact, we can scan a pair of bits instead of a single bit with the encoding defined in Table 2, where the added partial product is scaled by 2 for convenience of illustration.

TABLE 2

The conventional multiplier with a pair of bits scanned.

| $X_{i+1}X_i$ | Add to partial product |
| --- | --- |
| 00 | 0 |
| 01 | Y/2 |
| 10 | Y |
| 11 | 3Y/2 |

The sum of partial products is right shifted by two bits after each iteration in order to use Table 2, since a pair of bits in the multiplier is scanned. The difficulty in implementing Table 2 is that three times the multiplicand (3Y) is needed for $X_{i+1}X_i$=11. The simple shift operation is preferred, instead of the true multiplication in the encoding. Making use of the fact that 3Y=4Y−Y, a carry-in bit is generated and added to bit $X_{i+2}$ of the multiplier when $X_{i+1}X_i$ is 11, and Y is subtracted from the existing sum of product. The next pair is processed in the same manner. Because X is now modified, the modified version of X is referred to as Z. The new encoding table is shown in Table 3.

TABLE 3

The new encoding scheme for the multiplier.

| $Z_{i+1}Z_i$ | Add to partial product |
| --- | --- |
| 00 | 0 |
| 01 | Y/2 |
| 10 | Y |
| 11 | −Y/2 |

For the MSB in the multiplier, we have the encoding defined by Table 4.

TABLE 4

The new encoding scheme for MSB of the multiplier.

| $Z_{MSB}$ | Add to partial product |
| --- | --- |
| 0 | Y |
| 1 | −Y |

Combining Table 3 with Table 4, we have the Table 5 for the MSB triplets.

TABLE 5

The new encoding scheme for MSB triplet of the multiplier.

| $Z_{MSB}\ Z_{MSB-1}\ Z_{MSB-2}$ | Add to partial product |
| --- | --- |
| 000 | y |
| 001 | 3y/2 |
| 010 | 2y |
| 011 | y/2 |
| 100 | −y |
| 101 | −y/2 |
| 110 | 0 |
| 111 | −3y/2 |

Figure 2A:
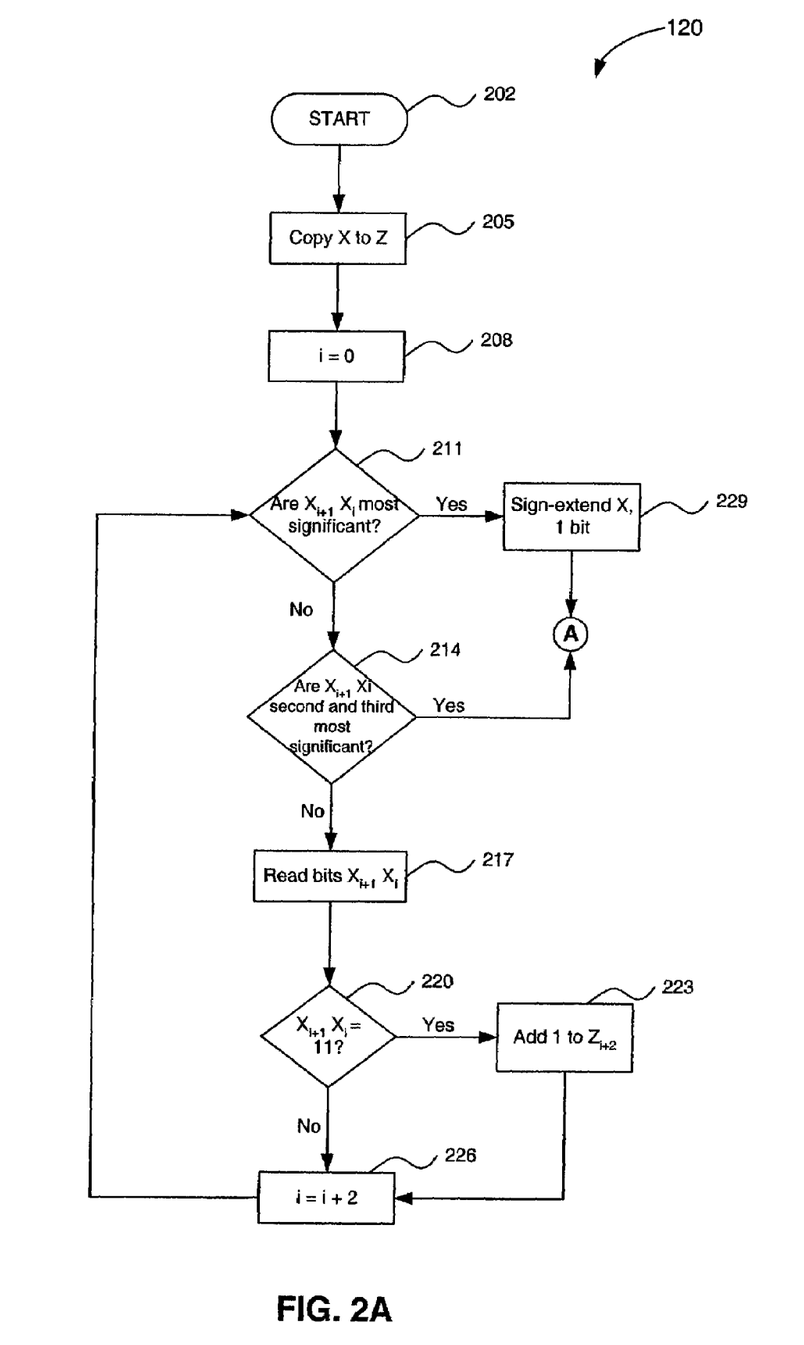
FIGS. 2A and 2B are flowcharts illustrating the encoding of a multiplier, according to an embodiment of the invention.
Figure 2B:
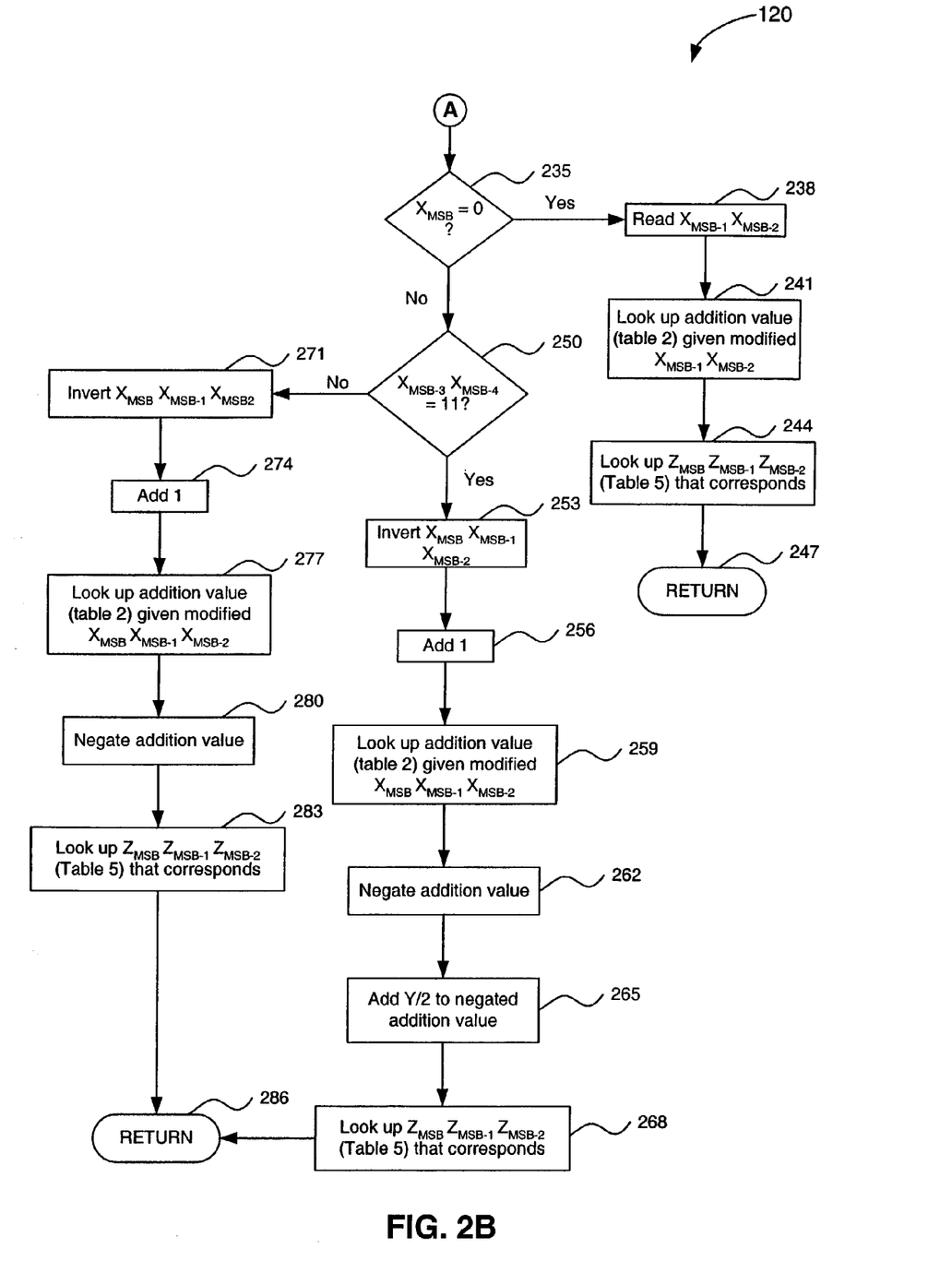

The process of encoding the multiplier is illustrated in greater detail in FIGS. 2A and 2B according to an embodiment of the invention. The process begins with step 202 in FIG. 2A. In step 205, the multiplier X is copied to a variable location Z. As will be seen below, the variable Z serves as working storage and contains the multiplier X as it is transformed, i.e. encoded, prior to multiplication with the value Y. In step 208, an index value i is initialized to 0. In step 211, a determination is made as to whether the pair of bits $X_{i+1}X_i$ are the most significant bits of X. In the initial iteration of this process, $X_{i+1}X_i$ are the least significant bits of the value X, i.e., $X_1X_0$. These are the first bits handled in the encoding process; subsequent iterations of the process will handle successive non-overlapping pairs of bits in X. If these two bits are not the most significant bits in X, the process continues at step 214. Here, a determination is made as to whether $X_{i+1}X_i$ are the second and third most significant bits, $X_{MSB-1}X_{MSB-2}$. If not, the process continues at step 217. Here, bits $X_{i+1}X_1$ are read. In step 220, a determination is made as to whether these bits are equal to 11. If not, the process continues at step 226, where the index I is incremented by 2. The process then continues at step 211, where the next two bits of X are considered. If, in step 220, it is determined that $X_{i+1}X_i$ is equal to 11, then the process proceeds to step 223. Here, one is added to $Z_{i+2}$. Any resulting carries are allowed to propagate as necessary through Z. The process then goes to step 226, where the index I is incremented by 2, and then to step 211.

If, in step 214, $X_{i+1}X_i$ are the second and third most significant bits $X_{MSB-1}X_{MSB-2}$, then the process continues as shown FIG. 2B, which will be described below. Moreover, if in step 211, $X_{i+1}X_i$ are the most significant bits, then the process proceeds to step 229. Here, the value X is sign extended by one bit. Therefore, if the most significant bit of X is 1, then an additional 1 is appended as the most significant bit; likewise, if the most significant bit of X is 0, then a 0 is appended as the most significant bit of X. The process then continues as shown in FIG. 2B.

The processing illustrated in FIG. 2B represents the processing of the most significant bits of X. In step 235, a determination is made as to whether $X_{MSB}$ is equal to 0. If so, the process continues at step 238. Here, 2 bits are read, $X_{MSB-1}X_{MSB-2}$. In step 241, these two bits are used to look up an addition value according to Table 2 above. In step 244, this above addition value is used to look up the three most significant bits of Z in Table 5.

If, in step 235, $X_{MSB}$ is not equal to 0, then the process continues at step 250. Here, a determination is made as to whether the bit pair $X_{MSB-3}X_{MSB-4}$ is equal to 11. If so, in step 253, the most significant three bits of X are inverted. In step 256, one is added to these three bits. Steps 253 and 256 collectively represent forming the two's complement of the three most significant bits of X. In step 259, the three bits are used to look up an addition value in Table 2 above. In step 262, the addition value is negated. In step 265, the value Y/2 is added to the negated addition value. In step 268, the resulting value is used to look up the three most significant bits of Z in Table 5.

If, in step 250, a determination is made that $X_{MSB-3}X_{MSB-4}$ is not equal to 11, then in step 271, the 3 most significant bits of X are inverted, and in step 274, one is added to these bits. Again, steps 271 and 274 collectively represent formation of the two's compliment of the three most significant bits of X. In step 277, these bits are used to look up an addition value using Table 2 above. In step 280, this addition value is negated. In step 283, the negated addition value is used to look up the three most significant bits of Z using Table 5. The process concludes at step 286.

Figure 3A:
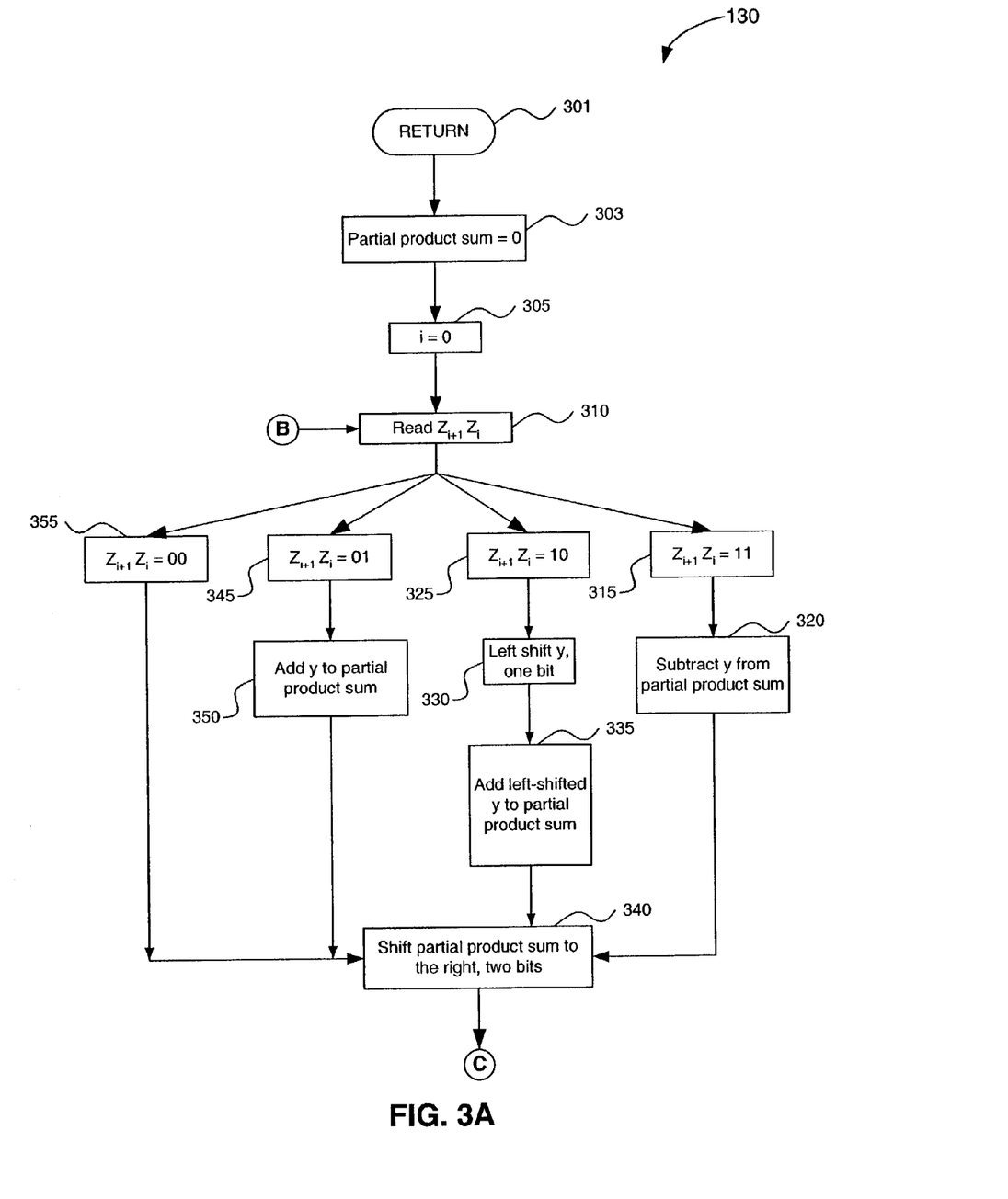
FIGS. 3A and 3B are flowcharts illustrating the multiplication of an encoded multiplier and a multiplicand, according to an embodiment of the invention.
Figure 3B:
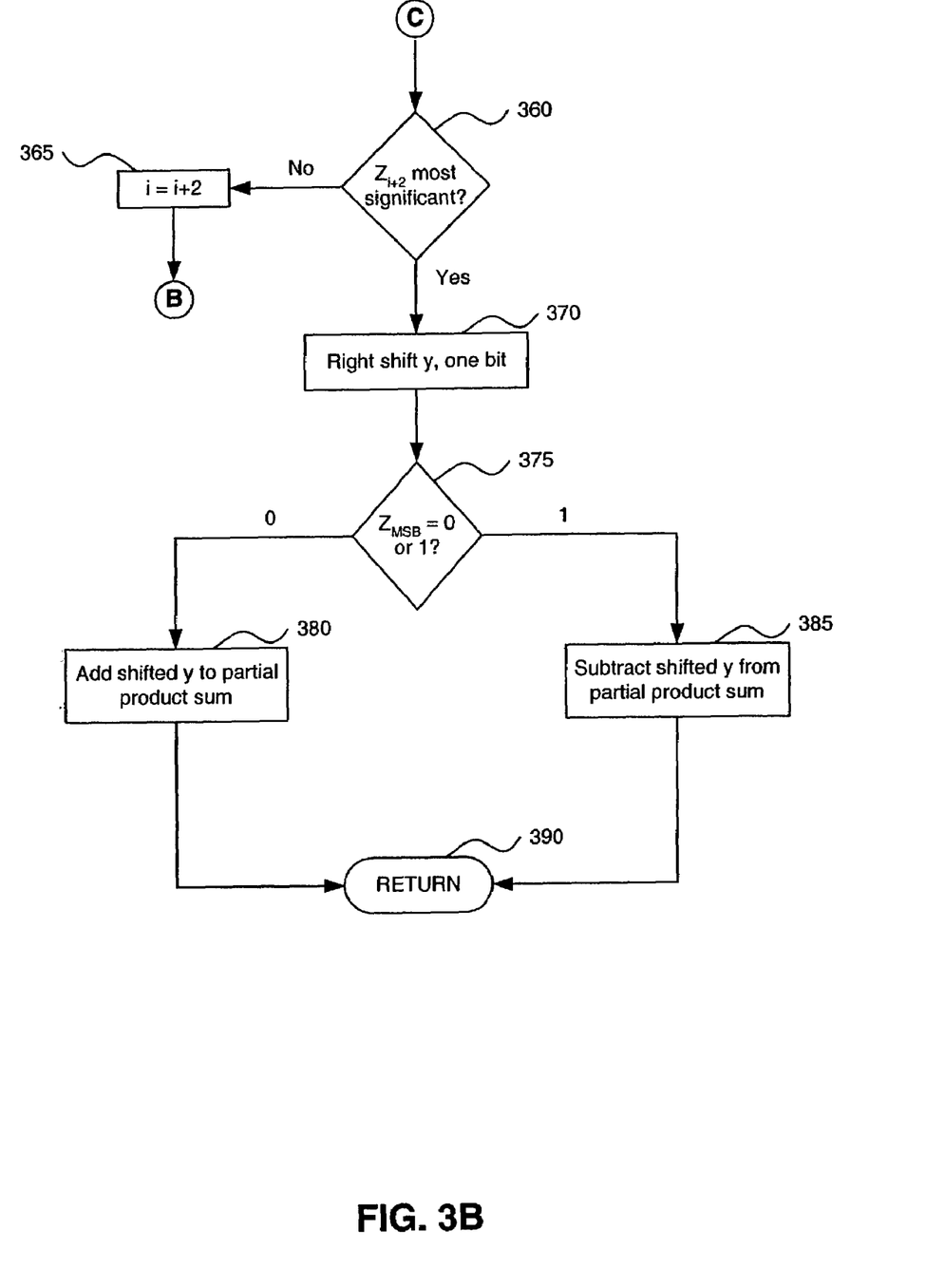

Step 130 above, the step of performing multiplication, is illustrated in greater detail in FIG. 3A and FIG. 3B. The process begins with step 301. In step 303, a partial product sum is initialized to 0. In step 305, an index value i is also initialized to 0. In step 310, the bit pair $Z_{i+1}Z_i$ is read. On the first iteration of this process, these bits represent the two least significant bits of the variable Z. The next step in the process depends on the value of these two bits. If the value is 11, then the process proceeds at step 315. In step 320, the value Y is subtracted from the existing sum of partial products. If the value of $Z_{i+1}Z_i$ is equal to 10, as shown in step 325, then in step 330, the value Y is shifted to the left by one bit. In step 335, this shifted Y value is added to the partial product sum. If the value of $Z_{i+1}Z_i$ is equal to 01 as shown in step 345, then in step 350 the value Y is added to the partial product sum. If the value of $Z_{i+1}Z_i$ is equal to 00 as shown in step 355, the process continues at step 340. Regardless of the value of $Z_{i+1}Z_i$, in step 340 the partial product sum is shifted to the right by two bits. The process then continues in FIG. 3B.

In step 360, a determination is made as to whether the bit $Z_{i+2}$ is the most significant bit of Z. If not, then in step 365, the index i is incremented by two and the process continues at step 310 of FIG. 3A, where the next two bits of Z are read.

If it is determined in step 360 that $Z_{i+2}$ is the most significant bit of Z, then the process continues at step 370. Here, the value Y is shifted to the right by one bit. In step 375, a determination is made as to whether the most significant bit of Z is 0 or 1. If the bit is 0, then in step 380 the shifted Y value is added to the partial product sum. If the most significant bit of Z is 1, then in step 385 the shifted Y value is subtracted from the partial product sum. The process concludes at step 390.

EXAMPLE 3

For the same numbers as Example 1, the above method comprises the following steps:

Step 1). Map X=0101 to Z=01101. Since X has an even bit width, its MSB pair 01 will be sign-extended to 001 before encoding to $Z_{MSB}Z_{MSB-1}Z_{MSB-2}$.

Step 2). Since the LSB pair $Z_1Z_0$=01, add the multiplicand 1001 to the initial partial product sum 0, and then shift the result two bits to the right. The bits $X_1X_0$ in the multiplier have now been processed.

Step 3). Since the next pair $Z_3Z_2$=11, subtract the multiplicand 1001 from the existing partial product sum, and then shift the result two bits to the right.

Step 4). Since $Z_4$=0, add the multiplicand 1001 to the existing partial product sum.

|   |    |   |   |   |   |   | |
|---|----|---|---|---|---|---|---|
|   |    |   | 0 | 0 | 0 | 0 | (initial partial product) |
|   |    |   | 1 | 0 | 0 | 1 | (step 2) |
|   | −1 | 0 | 0 | 1 |   |   | (step 3) |
| 1 | 0  | 0 | 1 |   |   |   | (step 4) |
| 0 | 1  | 0 | 1 | 1 | 0 | 1 | (product, decimal 45) |

II. System

Figure 4:
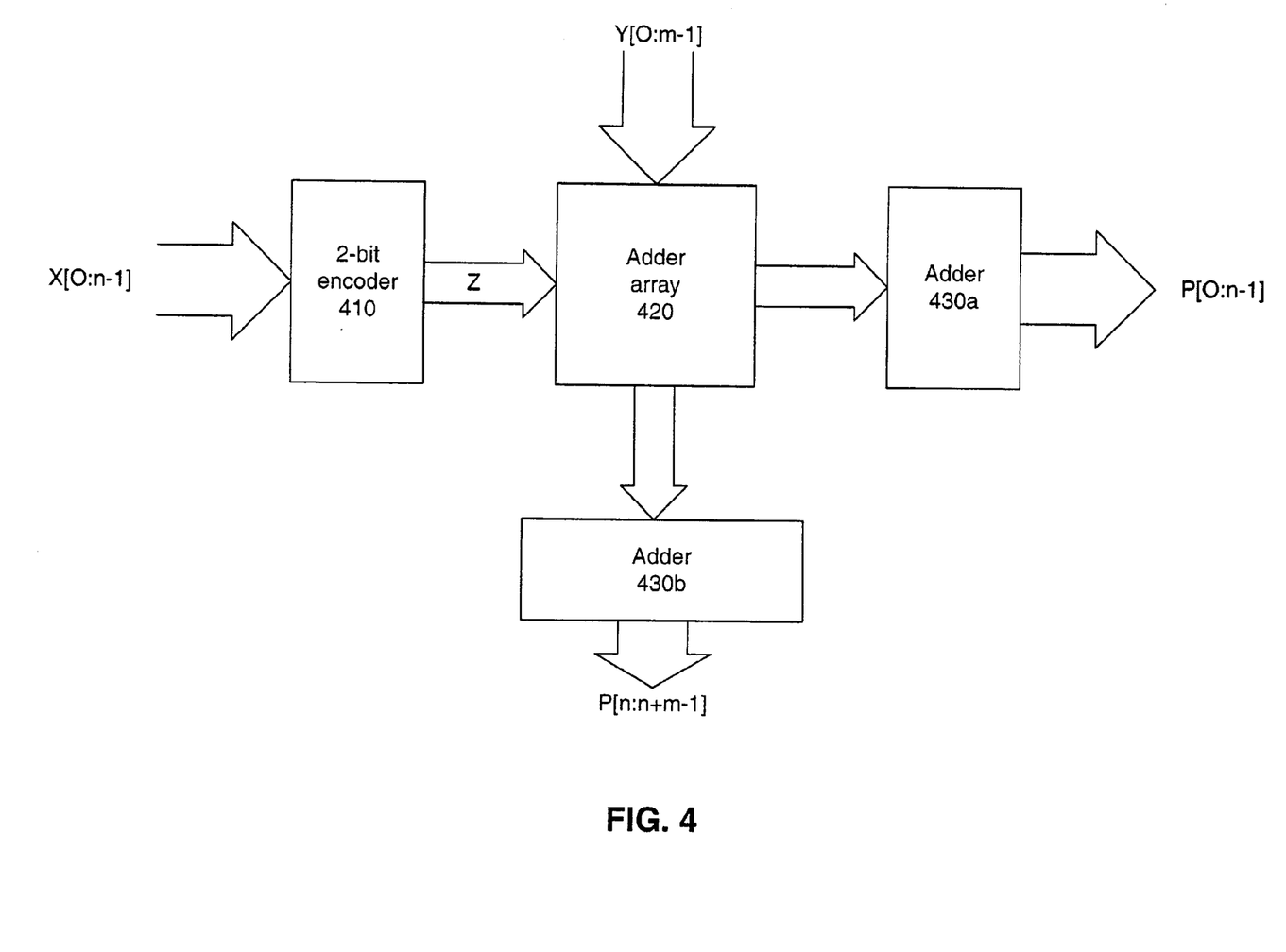
FIG. 4 is a block diagram illustrating a hardware embodiment of the invention.

The invention can be implemented in hardware, software, or a combination thereof. A hardware embodiment 400 is illustrated in FIG. 4. The multiplier X is input to a 2-bit encoder 410. Encoder 410 embodies the logic of the encoding process described above with respect to FIGS. 2A and 2B. Encoder 410 outputs Z, which is then input to adder array 420. The multiplicand Y is also input to adder array 420. The bits of Z are used as control signals that determine what form of Y to apply to the partial product sum. As seen in FIG. 3B, Y may have to be shifted, negated, etc., depending on the bit pairs of Z. The actual addition is performed in a pair of twin adders 430a and 430b. These adders cooperatively generate a product. Adder 430a produces the first n bits of the product, where n is the length of the multiplier X; adder 430b produces the last m bits of the product, where m is the length of the multiplicand Y. Note that the logic of modules 410, 420, 430a and 430b can be implemented with any standard cell family, as would be known to a person of ordinary skill in the art.

III. Computing Environment

Figure 5:
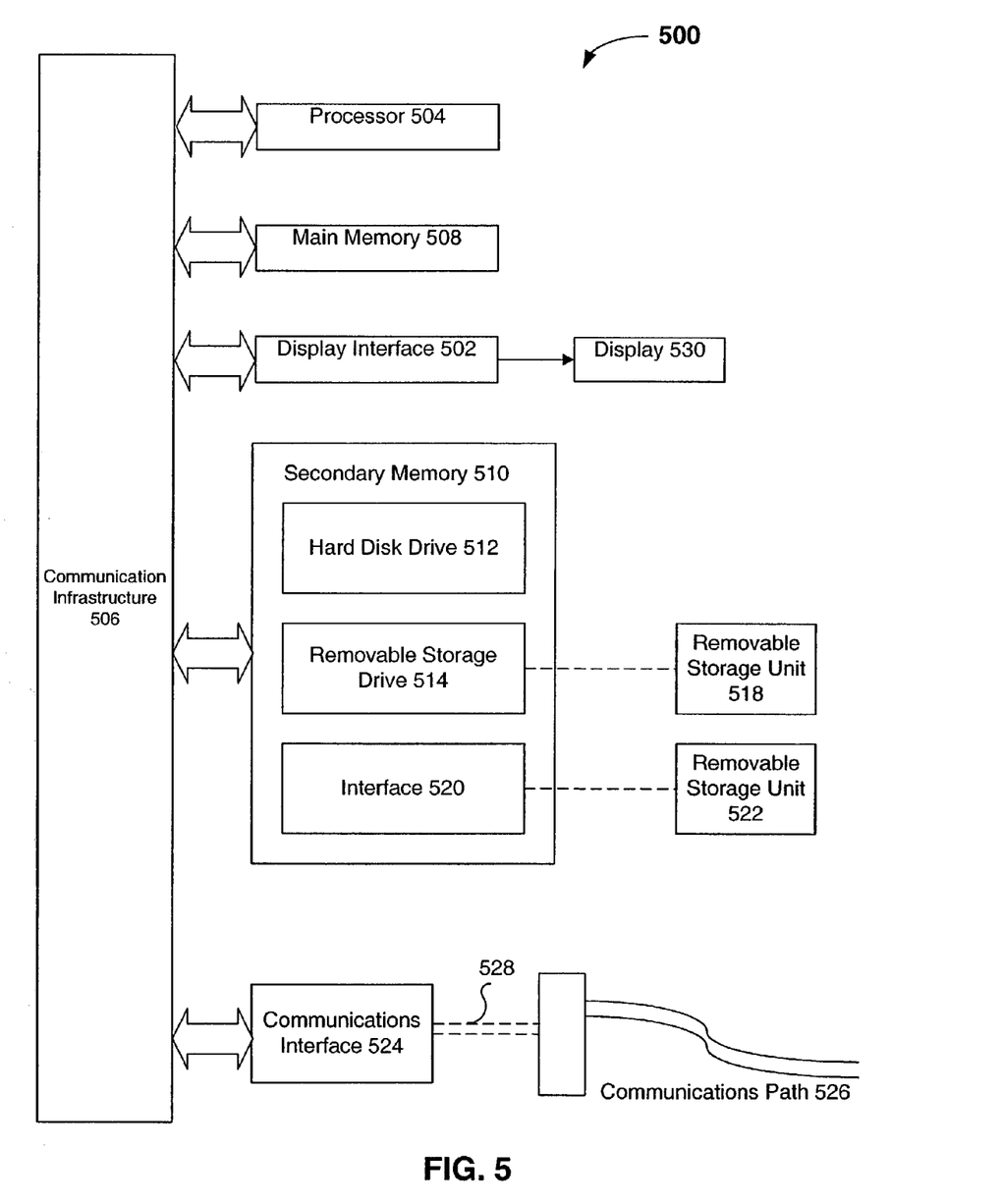
FIG. 5 is a block diagram illustrating a computing platform on which a software embodiment of the invention can execute.

The present invention may be implemented using hardware, software or a combination thereof and may be implemented in a computer system or other processing system. In an embodiment, the invention is directed toward a computer program product executing on a computer system capable of carrying out the functionality described herein. An example of a computer system 500 is shown in FIG. 5. The computer system 500 includes one or more processors, such as processor 504. The processor 504 is connected to a communication bus 506. Various software embodiments are described in terms of this example computer system. After reading this description, it will become apparent to a person skilled in the relevant art how to implement the invention using other computer systems and/or computer architectures.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCM-CIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, a phone line, a cellular phone link, an RF link and other communications channels. In an embodiment of the invention, signals 528 comprise input values, multiplier X and multiplicand Y. Alternatively, these values can be read from secondary memory 510.

In this document, the terms "computer program medium" and "computer usable medium" are used to generally refer to media such as removable storage drive 514, a hard disk installed in hard disk drive 512, and signals 528. These computer program products are means for providing software to computer system 500.

Computer programs (also called computer control logic) are stored in main memory 508 and/or secondary memory 510. Computer programs may also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

IV. Conclusion

While the various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above described exemplary embodiments, but should be defined only in accordance with the following claims and their equivalents.

What is claimed is:

1. A method of multiplying a binary multiplier X with a binary multiplicand Y comprising the steps of:
   (a) creating a copy Z of multiplier X;
   (b) reading the least significant pair of bits of X;
   (c) if the most recently read pair of multiplier bits $X_{i+1}X_i$ is equal to 11, adding 1 to $Z_{i+2}$;
   (d) if more than three bits remain unread in multiplier X, reading the next two bits of X and returning to step (c);
   (e) otherwise, encoding the remaining unread bits of multiplier X;
   (f) multiplying Z and Y, to create a product X·Y; and
   (g) generating an electrical signal that represents the product.
   wherein step (e) comprises the steps of:
   (i) if there are two remaining unread bits in X, performing a one bit sign extension, to produce a third unread bit;

9

(ii) if the most significant unread bit $X_{MSB}$ equals 0, then performing the following:

(A) reading $X_{MSB-1}X_{MSB-2}$;
(B) looking up an addition value, corresponding to $X_{MSB-1}X_{MSB-2}$, in the following table:

| $X_{MSB-1}X_{MSB-2}$ | Addition value |
|---|---|
| 00 | 0 |
| 01 | Y/2 |
| 10 | Y |
| 11 | 3Y/2 |

(C) looking up $Z_{MSB}Z_{MSB-1}Z_{MSB-2}$ corresponding to the addition value in the following table:

| $Z_{MSB}Z_{MSB-1}Z_{MSB-2}$ | Addition value |
|---|---|
| 000 | Y |
| 001 | 3Y/2 |
| 010 | 2Y |
| 011 | Y/2 |
| 100 | −Y |
| 101 | −Y/2 |
| 110 | 0 |
| 111 | −3Y/2 | and (D) writing $Z_{MSB}Z_{MSB-1}Z_{MSB-2}$ to Z;

(iii) otherwise, performing the following:

(A) forming the two's complement of $X_{MSB}X_{MSB-1}X_{MSB-2}$ to form complemented $X_{MSB}X_{MSB-1}X_{MSB-2}$;
(B) looking up an addition value, corresponding to the complemented $X_{MSB}X_{MSB-1}X_{MSB-2}$, in the following table:

| $X_{MSB-1}X_{MSB-2}$ | Addition value |
|---|---|
| 00 | 0 |
| 01 | Y/2 |
| 10 | Y |
| 11 | 3Y/2 |

(C) negating the addition value;
(D) if $X_{MSB-3}X_{MSB-4}$ equals 11, increasing the negated addition value by Y/2;
(E) looking up $Z_{MSB}Z_{MSB-1}Z_{MSB-2}$ corresponding to the negated addition value in the following table:

| $Z_{MSB}Z_{MSB-1}Z_{MSB-2}$ | Negated addition value |
|---|---|
| 000 | Y |
| 001 | 3Y/2 |
| 010 | 2Y |
| 011 | Y/2 |
| 100 | −Y |
| 101 | −Y/2 |
| 110 | 0 |
| 111 | −3Y/2 | and (F) writing $Z_{MSB}Z_{MSB-1}Z_{MSB-2}$ to Z.

2. The method of claim 1, wherein step (f) comprises the following steps:

(i) initializing a partial product sum to zero;
(ii) reading the least significant pair of bits of Z;
(iii) if the most recently read pair of bits of Z, $Z_{i+1}Z_i$, is equal to 11, modifying the partial product sum by subtracting Y;
(iv) if $Z_{i+1}Z_i$ is equal to 10, left shifting Y and modifying the partial product sum by adding the left shifted Y;
(v) if $Z_{i+1}Z_i$ is equal to 01, modifying the partial product sum by adding Y;
(vi) right shifting the partial product sum by two bits;
(vii) if the next bit of Z, $Z_{i+2}$, is not the most significant bit of Z, reading the next two bits of Z and returning to step (iii);
(viii) right shifting Y by one bit;
(ix) if the most significant bit of Z is 1, subtracting the right shifted Y from the partial product sum to produce XÿY; and
(x) if the most significant bit of Z is 0, adding the right shifted Y to the partial product sum to produce XÿY.

3. A system for multiplying two binary numbers, the system comprising a two-bit encoder, wherein the encoder comprises:

means for creating a copy Z of multiplier X;
means for reading successive, non-overlapping pairs of bits of X, $X_{i+1}X_i$, starting with the least significant pair, until the two or three most significant bits of X remain;
means for adding 1 to $Z_{i+2}$ after each pair $X_{i+1}X_i$ is read, if the read pair of bits $X_{i+1}X_i$ is equal to 11;
means for performing a one bit sign extension, to produce a third unread bit, when there are two remaining unread bits;
means for performing the following if the most significant unread bit $X_{MSB}$ equals 0:

(A) reading $X_{MSB-1}X_{MSB-2}$;
(B) looking up an addition value, corresponding to $X_{MSB-1}X_{MSB-2}$, in the following table:

| $X_{MSB-1}X_{MSB-2}$ | Addition value |
|---|---|
| 00 | 0 |
| 01 | Y/2 |
| 10 | Y |
| 11 | 3Y/2 |

(C) looking up $Z_{MSB}Z_{MSB-1}Z_{MSB-2}$, corresponding to the addition value in the following table:

| $Z_{MSB}Z_{MSB-1}Z_{MSB-2}$ | Addition value |
|---|---|
| 000 | Y |
| 001 | 3Y/2 |
| 010 | 2Y |
| 011 | Y/2 |
| 100 | −Y |
| 101 | −Y/2 |
| 110 | 0 |
| 111 | −3Y/2 | and (D) writing $Z_{MSB}Z_{MSB-1}Z_{MSB-2}$ to Z; and means for performing the following if the most significant unread bit $X_{MSB}$ equals 1:

(A) forming two's complement of $X_{MSB}X_{MSB-1}X_{MSB-2}$ to form complemented $X_{MSB}X_{MSB-1}X_{MSB-2}$;
(B) looking up an addition value, corresponding to the complemented $X_{MSB}X_{MSB-1}X_{MSB-2}$, in the following table:

| $X_{MSB-1}X_{MSB-2}$ | Addition value |
| --- | --- |
| 00 | 0 |
| 01 | Y/2 |
| 10 | Y |
| 11 | 3Y/2 |

(C) negating the addition value;
(D) if $X_{MSB-3}X_{MSB-4}$ equals 11, increasing the negated addition value by Y/2;
(E) looking up $Z_{MSB}Z_{MSB-1}Z_{MSB-2}$ corresponding to the negated addition value in the following table:

| $Z_{MSB}Z_{MSB-1}Z_{MSB-2}$ | Negated addition value |
| --- | --- |
| 000 | Y |
| 001 | 3Y/2 |
| 010 | 2Y |
| 011 | Y/2 |
| 100 | −Y |
| 101 | −Y/2 |
| 110 | 0 |
| 111 | −3Y/2 | and
(F) writing $Z_{MSB}Z_{MSB-1}Z_{MSB-2}$ to Z;
means for multiplying Z and Y, to create a product X·Y; and,
means for generating an electrical signal that represents the product.

4. The system of claim 3, further comprising an adder array, wherein the adder array comprises:
means for reading successive, non-overlapping pairs of bits of Z, starting with the least significant pair, until the two most significant bits of Z remain;
means for applying −Y to the partial product sum if the read pair of bits of Z, $Z_{i+1}Z_i$, is equal to 11;
means for left shifting Y and applying said left shifted Y to the partial product sum, if $Z_{i+1}Z_i$ is equal to 10;
means for applying Y to the partial product sum if $Z_{i+1}Z_i$ is equal to 01;
means for right shifting Y by one bit;
means for negating said right shifted Y and applying said negated right shifted Y to the partial product sum if the most significant bit of Z is 1; and
means for applying said right shifted Y to the partial product sum if the most significant bit of Z is 0.

5. A computer program product comprising one or more computer readable storage devices having control logic stored therein for causing a computer to multiply a binary multiplier X with a binary multiplicand Y, the computer control logic comprising: first computer readable program code means for causing the computer to create a copy Z of multiplier X; second computer readable program code means for causing the computer to read successive, non-overlapping pairs of bits of X, starting with the least significant pair, until the two or three most significant bits of X remain; third computer readable program code means for causing the computer to add 1 to $Z_{i+2}$ if the most recently read pair of multiplier bits $X_{i+1}X_i$ is equal to 11; fourth computer readable program code means for causing the computer to perform a one bit sign extension, to produce a third unread bit, when there are two remaining unread bits; fifth computer readable program code means for causing the computer to perform the following if the most significant unread bit $X_{MSB}$ equals 0:
eight computer readable program code means for causing the computer to create and electrical signal that represents the product.
(A) reading $X_{MSB-1}X_{MSB-2}$; (B) looking up an addition value, corresponding to $X_{MSB-1}X_{MSB-2}$, in the following table:

| $X_{MSB-1}X_{MSB-2}$ | Addition value |
| --- | --- |
| 00 | 0 |
| 01 | Y/2 |
| 10 | Y |
| 11 | 3Y/2 |

(C) looking up $Z_{MSB}Z_{MSB-1}Z_{MSB-2}$ corresponding to the addition value in following table:

| $Z_{MSB}Z_{MSB-1}Z_{MSB-2}$ | Addition value |
| --- | --- |
| 000 | Y |
| 001 | 3Y/2 |
| 010 | 2Y |
| 011 | Y/2 |
| 100 | −Y |
| 101 | −Y/2 |
| 110 | 0 |
| 111 | −3Y/2 | and
(D) writing $Z_{MSB}Z_{MSB-1}Z_{MSB-2}$ to Z; sixth computer readable program code means for causing the computer to perform the following if the most significant unread bit $X_{MSB}$ equals 1:
(A) forming the two's complement of $X_{MSB}X_{MSB-1}X_{MSB-2}$ to form complemented $X_{MSB}X_{MSB-1}X_{MSB-2}$;
(B) looking up an addition value, corresponding to the complemented $X_{MSB}X_{MSB-1}X_{MSB-2}$, in the following table:

| $X_{MSB-1}X_{MSB-2}$ | Addition value |
| --- | --- |
| 00 | 0 |
| 01 | Y/2 |
| 10 | Y |
| 11 | 3Y/2 |

(C) negating the addition value;
(D) if $X_{MSB-3}X_{MSB-4}$ equals 11, increasing the negated addition value by Y/2;
(E) looking up $Z_{MSB}Z_{MSB-1}Z_{MSB-2}$ corresponding to the addition value in the following table:

| $Z_{MSB}Z_{MSB-1}Z_{MSB-2}$ | Negated addition value |
| --- | --- |
| 000 | Y |
| 001 | 3Y/2 |

-continued

| $Z_{MSB}Z_{MSB-1}Z_{MSB-2}$ | Negated addition value |
|---|---|
| 010 | 2Y |
| 011 | Y/2 |
| 100 | −Y |
| 101 | −Y/2 |
| 110 | 0 |
| 111 | −3Y/2 | and (F) writing $Z_{MSB}Z_{MSB-1}Z_{MSB-2}$ to Z;

seventh computer readable program code means for causing the computer to multiply Z and Y, to create a product X·Y; and eighth computer readable program code means for causing the computer to create an electrical signal that represents the product.

6. The computer program product of claim 5, further comprising:

ninth computer readable program code means for causing the computer to initialize a partial product sum to zero;

tenth computer readable program code means for causing the computer to read successive, non-overlapping pairs of bits of Z, starting with the least significant pair, until the two most significant bits of Z remain;

eleventh computer readable program code means for causing the computer to modify the partial product sum by subtracting Y, if the most recently read pair of bits of Z, $Z_{i+1}Z_i$, is equal to 11;

twelfth computer readable program code means for causing the computer to left shift Y and modify the partial product sum by adding the left shifted Y, if $Z_{i+1}Z_i$ is equal to 10;

thirteenth computer readable program code means for causing the computer to modify the partial product sum by adding Y, if $Z_{i+1}Z_i$ is equal to 01;

fourteenth computer readable program code means for causing the computer to right shift the partial product sum by two bits;

fifteenth computer readable program code means for causing the computer to right shift Y by one bit;

sixteenth computer readable program code means for causing the computer to subtract the right shifted Y from the partial product sum to produce X·Y, if the most significant bit of Z is 1; and seventeenth computer readable program code means for causing the computer to add the right shifted Y to the partial product sum to produce X·Y, if the most significant bit of Z is 0.

* * * * *

UNITED STATES PATENT AND TRADEMARK OFFICE
CERTIFICATE OF CORRECTION

| | |
|---|---|
| PATENT NO. | : 7,191,203 B2 |
| APPLICATION NO. | : 10/253640 |
| DATED | : March 13, 2007 |
| INVENTOR(S) | : Minsheng Wang |

Page 1 of 1

It is certified that error appears in the above-identified patent and that said Letters Patent is hereby corrected as shown below:

<u>Column 8</u>
Line 64 please replace "product." with --product;--.

<u>Column 11</u>
Line 35 please replace "and," with --and--.

<u>Column 12</u>
Line 8-10 please delete section "eight computer readable program code means for causing the computer to create and electrical signal that represents the product."

Signed and Sealed this

Twenty-eighth Day of July, 2009

JOHN DOLL
*Acting Director of the United States Patent and Trademark Office*